Feb. 28, 1928.
P. Q. WILLIAMS
1,660,463
LEER CONVEYER MECHANISM
Filed April 25, 1923
2 Sheets-Sheet 1
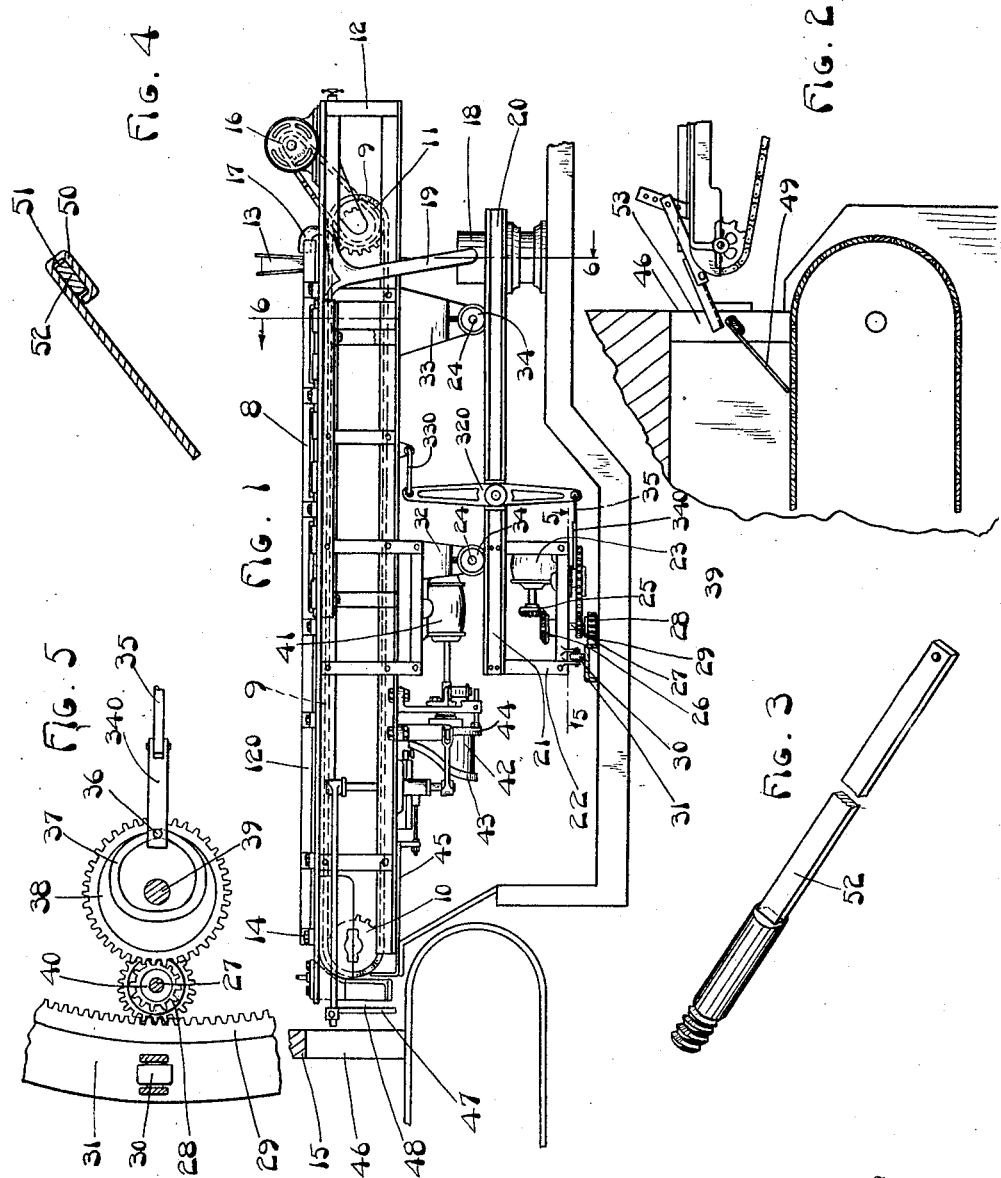
Inventor
PERCY Q. WILLIAMS
By Walter P. Murray
Attorney Inventor
PERCY Q. WILLIAMS Patented Feb. 28, 1928.

1,660,463

UNITED STATES PATENT OFFICE.

PERCY Q. WILLIAMS, OF CINCINNATI, OHIO.

LEER-CONVEYER MECHANISM.

Application filed April 25, 1923. Serial No. 634,603.

An object of my invention is to provide a leer conveyer mechanism provided with means for placing articles in a straight transverse row at the forward or receiving end of the leer.

Another object of my invention is to provide a simple and efficient device for the purpose stated.

Another object of my invention is to provide simplified structures over what are disclosed in my hereafter referred to co-pending applications as well as the disclosures in other devices with which I am familiar.

These and other objects are attained by the means described herein and disclosed in the accompanying drawings, in which:

Fig. 1 is a side elevation of a leer conveyer mechanism embodying my invention.

Fig. 2 is an enlarged fragmental side elevation of a modified form of discharge mechanism that may be employed with the device shown in Fig. 1.

Fig. 3 is a perspective view of a support bar forming a detail of the mechanism shown in Fig. 2.

Fig. 4 is an enlarged sectional view showing a bank plate forming a detail of my invention.

Fig. 5 is an enlarged detail view of a cam mechanism taken on line 5—5 of Fig. 1 and forming a detail of my invention.

Figure 6:
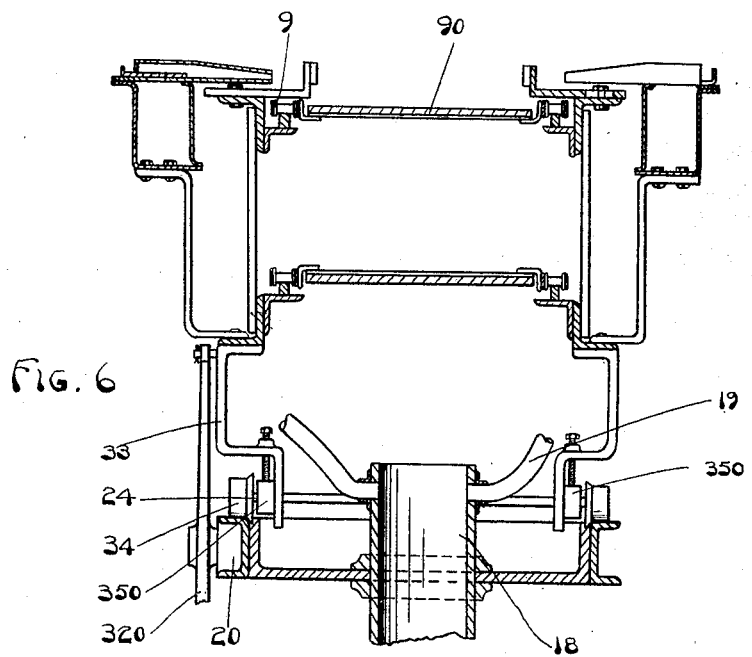
Fig. 6 is an enlarged sectional view on line 6—6 of Fig. 1.
Figure 7:
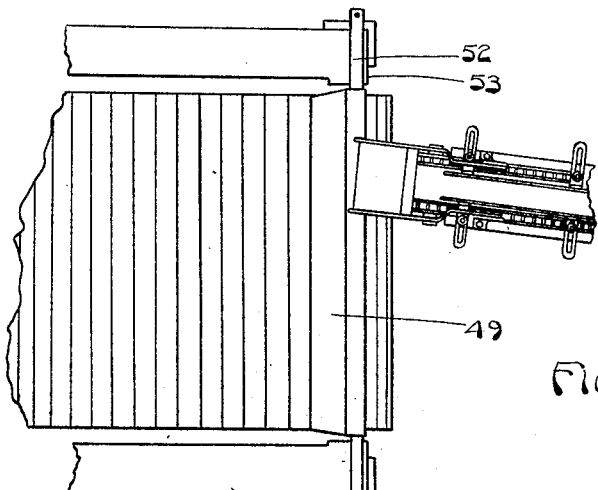
Fig. 7 is a fragmental plan view of the device shown in Fig. 2.

The conveyer 8 may be of any suitable type or kind for example as shown in my several co-pending applications now Patents 1,487,001, March 18, 1924; 1,507,301, Sept. 2, 1924; 1,537,277, May 12, 1925. Briefly the conveyer comprises a chain 9 carrying a belt 90 and extending between drums or sprockets 10 and 11 at opposite ends of the conveyer frame 120 for carrying ware from the forward end 12 of such conveyer where the ware is received from a chute 13 to the rear end 14 of such conveyer from whence the ware is directed or discharged into the leer or annealing oven 15. The chain is driven from a suitable motor 16 as disclosed in my co-pending applications. An air blast system comprising air discharge nozzles 17 is provided for directing blasts of air upon the upper face of the moving element of the conveyer, and communication is effected between such nozzles and a suitable source of compressed air or the like by means of a tube 18 and a flexible connection 19 connecting the tube and the nozzles. In my referred to co-pending applications the conveyer 8 is pivotally mounted and has its axis in common with the tube 18. In the instant device a track 20 is mounted for oscillation about its axis that is also common to the tube 18. The rear end 21 of the track 20 carries a depending platform 22. The platform carries a motor 23 and suitable oscillating mechanism that may be of any suitable type, for example as disclosed in my co-pending applications now Patents 1,487,001 and 1,507,301. Briefly this oscillating mechanism comprises a bevel gear 25 carried by the motor shaft and engaging a bevel gear 26 mounted upon the shaft 27 extending through the platform and carrying a spur gear 28 at its lower end. The spur gear engages an arcuate rack 29. A suitable electrical switch apparatus is provided for reversing the motor 23 at the limits of oscillation. Such apparatus may be in accordance with the disclosures in my United States Letters Patents Nos. 1,487,000; 1,487,001; 1,507,301; or my co-pending application, Serial No. 578,406. The platform carries suitable supporting rollers 30 that ride upon a channel bar or the like 31. The channel bar may be adjustable vertically if desired, as disclosed in my co-pending applications. From the foregoing it will be apparent that the action of the motor 23 will serve to oscillate the track 20 about its pivotal mounting on the tube 18. The conveyer frame 8 is reciprocally mounted upon the track 20 for movement longitudinally of the track 20. Any suitable supporting structure may be provided for this purpose, for example suitable brackets 32 and 33 depending from the frame 120 may carry axles 24 and flanged wheels 34 that engage the tracks 20. If desired the track 20 may be grooved to preclude lateral displacement of the wheels 34 thereby dispensing with the flanges upon the wheels. The brackets 32 and 33 may each carry a block 350 adjustable vertically relative to the frame, and the block may carry the axle 24. By adjusting the block, the ends of the frame may be elevated and lowered to accommodate any of the discharge structures shown herein and in my co-pending applications, and thereby also dispensing with vertical adjustment of the channel 31. The track 20 has pivotally mounted on it a pitman 320 having its upper end pivotally connected with the conveyer frame 120 by means of a link 330, and having its lower end connected with a reciprocating cam follower 340 by means of a link 35 pivotally mounted at its opposite ends upon the pitman and the cam follower. The cam follower has a bearing 36, which may take the form of a roller, that engages in a groove 37 formed in the side of the gear 38 mounted on the shaft 39 supported by the platform 22. The gear 38 is rotatably actuated from a gear 40 mounted on the shaft 27. The grooved gear functions as a cam, the groove being so formed that the conveyer frame is moved longitudinally of the track 20 to such extent that the forward and rear ends of such frame are retained in substantially constant relation to the leer 15 and the chute 13. The rear end of the conveyer frame 120 may carry any suitable ware discharging means, for example it may be provided with means for seating ware upon end as disclosed in Fig. 1 and in my co-pending application now Patent 1,537,277, or be provided with a discharge chute as disclosed in Fig. 2 and in my United States Letters Patent No. 1,487,001 for stacking small ware. The device shown herein in Fig. 1, comprises briefly a motor 41 carried by the conveyer frame 120 operating the cam 42 having cam faces 43 and 44 that are utilized in reciprocating a pusher plate 45 for moving ware through the opening 46 in the leer 15, and for rotatively actuating the plates 47 that form walls for a pocket 48 into which pocket the belt 90 discharges ware.

By providing a structure wherein the conveyer frame is actuated longitudinally to compensate for the recession of the free end of the track 20 from the leer because of the oscillation thereof, the discharge end of the conveyer retains substantially a constant relation to the length of the leer 15 although the position of the discharge end of the conveyer is modified laterally. When small ware is being handled, the bank plate 49 is mounted at the mouth or opening 46 of the leer and constitutes a retaining wall and the conveyer discharges the ware upon the plate 49 and the ware heaped against the retaining wall. The plate 49 is of a flat construction as distinguished from the arcuate plates disclosed in my co-pending application. The one end of the plate 49 is turned upon itself as shown at 50, see Fig. 4, whereby an eye 51 is provided for the reception of a support bar 52 removably extending through the walls 53 of the leer. In view of the simple mounting of the bar 52 and the plate 49 it is possible to readily mount and demount the plate 49 whereby to condition the leer for the reception of small ware that is stacked or heaped as it is discharged from the conveyer 8, or to condition the leer for the reception of ware that is set on end by a mechanism such as disclosed at the discharge end of the conveyer shown in Fig. 1. In fact, this change may be made so expeditiously that it is unnecessary to permit the leer to cool in order to make the change. In devices such as shown in my co-pending applications, the arcuate plates, because of their peculiarity of form are bolted to the sides of the leer and therefore are not so readily mounted and demounted.

In the operation of my device ware is deposited at the forward end 12 of the conveyer by the chute 13 and is carried to the rear or discharge end thereof. The movement of the conveyer laterally may be a step by step movement or a slow continuous movement, this being determined by the particular switching mechanism employed with the motor 23. As the track 20 oscillates, due to the action of the motor 23, the cam gear 38 is revolved and the pitman 32 is moved about its pivotal mounting whereby to move the conveyer frame 8 longitudinally of the track 20 to at all times dispose the discharge point of the conveyer on a straight line extending transversely of the leer 15.

What I claim is:

1. In a device of the class described the combination of a leer, a conveyer for carrying ware to the leer, and means for simultaneously oscillating and reciprocating the conveyer for loading ware into the leer on a line extending substantially transversely to the leer.

2. In a device of the class described the combination of a leer, a conveyer for carrying ware to the leer, and means for simultaneously oscillating and reciprocating the conveyer for loading ware into the leer on a straight line extending between the side walls of the leer.

3. In a device of the class described, the combination with a leer having an opening at one end, of a conveyer located exteriorly of the leer and extending in substantial alignment with the leer, means for imparting an angular movement to the conveyer and moving the discharge end thereof laterally of the leer opening, and means for simultaneously imparting an endwise movement to the conveyer, whereby the discharge end thereof is caused to move in a substantially straight line across the leer and is maintained at a constant distance from the leer opening.

4. In a device of the class described the combination with a track mounted for oscillation, a conveyer mounted reciprocally on the track and means for jointly oscillating the track and reciprocating the conveyer.

5. In a device of the class described the combination with a reciprocating conveyer, of an oscillating support for the reciprocating conveyer, and means for oscillating the support and reciprocating the conveyer.

6. In a device of the class described the combination of a pivotally mounted track, a platform carried by the track, a shaft revolubly mounted on the platform, means for alternately actuating the shaft in opposite directions, a gear carried by the shaft, an arcuate rack engaging the gear, a cam driven from the shaft, a cam follower for the cam, a conveyer reciprocally mounted on the track, and a connection between the cam follower and the conveyer for converting the movement of the cam follower into a reciprocating movement of the conveyer.

7. In a device of the class described the combination of a pivotally mounted track, a platform carried by the track, a shaft revolubly mounted on the platform, means for alternately actuating the shaft in opposite directions, a gear carried by the shaft, an arcuate rack engaging the gear, a cam driven from the shaft, a cam follower for the cam, a conveyer reciprocally mounted on the track, a connection between the cam follower and the conveyer for converting the movement of the cam follower into a reciprocating movement of the conveyer, and means for elevating the conveyer relative to the track.

8. In a device of the class described the combination with a track mounted for oscillation, a conveyer mounted reciprocally on the track means for jointly oscillating the track and reciprocating the conveyer, and means for adjusting the frame toward and away from the oscillating track.

9. In a device of the class described the combination of a track pivotally mounted adjacent one of its ends, means adjacent the other end of the track for oscillating the track about its pivotal mounting, a pitman pivotally mounted on the track having one of its ends connected with the track oscillating means for effecting oscillation of the pitman, a conveyor mounted for reciprocation on the track, and a connection between the other end of the pitman, and the conveyer for converting the oscillatory movement of the pitman into a reciprocating movement of the conveyer.

10. In a device of the class described the combination of a track pivotally mounted adjacent one of its ends, means adjacent the other end of the track for oscillating the track about its pivotal mounting, a pitman pivotally mounted on the track having one of its ends connected with the track oscillating means for effecting oscillation of the pitman, a conveyer mounted for reciprocation on the track, a connection between the other end of the pitman and the conveyer for converting the oscillatory movement of the pitman into a reciprocating movement of the conveyer, and means for adjusting the frame toward and away from the track.

11. The combination of a leer, a leer conveyer, a supporting wall having a plane inclined upper face, the wall extending across the front of the leer over said conveyer in position to retain in a heap, articles delivered to the conveyer, a second conveyer for carrying ware to the leer and arranged to discharge the ware over said supporting wall, and means for imparting a combined oscillating and reciprocating movement to said second conveyer by which its discharge end is carried along said wall and maintained in operative relation thereto.

12. The combination of a leer, a leer conveyer, a supporting wall extending across the front of the leer over said conveyer in position to retain in a heap, articles conveyed to the leer, said wall having a plane upwardly exposed inclined surface, a second conveyer exterior to the leer for carrying ware to the leer and having its delivery end arranged over said supporting wall, and means to simultaneously oscillate and reciprocate said second conveyer and cause said delivery end to travel back and forth in a substantially straight line lengthwise of said wall.

13. The combination of a leer, a leer conveyer, a second conveyer for conveying ware to the leer, a plate having a plane inclined face over which ware moves under the influence of gravity when delivered to it by the second conveyer, and means for imparting a combined oscillating and reciprocating movement to said second conveyer by which the delivery end thereof is moved back and forth in a straight line lengthwise of and in operative relation to said plate.

14. The combination of a leer having side walls, a leer conveyer, a bar removably supported by the side walls of the leer and extending transversely thereof above the conveyer, an inclined plate removably supported by the bar and extending across the leer, a second conveyer for carrying ware to the leer and having one end thereof above said plate for delivering ware thereto, and means for simultaneously oscillating and reciprocating said second conveyer and causing its discharge end to move in a substantially straight line parallel with said plate.

In testimony whereof, I have hereunto subscribed my name this 17th day of April, 1923.

PERCY Q. WILLIAMS.